Oct. 6, 1936.    G. E. EDMUNDS ET AL    2,056,652
SPRING MOUNTED CAR
Original Filed April 7, 1933    9 Sheets-Sheet 2

Oct. 6, 1936.  G. E. EDMUNDS ET AL  2,056,652
SPRING MOUNTED CAR
Original Filed April 7, 1933  9 Sheets-Sheet 7

Oct. 6, 1936.    G. E. EDMUNDS ET AL    2,056,652
SPRING MOUNTED CAR
Original Filed April 7, 1933    9 Sheets-Sheet 8

Inventors
Glenn E. Edmunds,
Roy C. Purkhiser,
By Cushman, Darby & Cushman
Attorneys Patented Oct. 6, 1936

2,056,652

UNITED STATES PATENT OFFICE 2,056,652

SPRING MOUNTED CAR

Glenn E. Edmunds and Roy C. Purkhiser, Columbus, Ohio, assignors to The Bonney-Floyd Company, Columbus, Ohio, a corporation of Ohio Application April 7, 1933, Serial No. 665,012
Renewed September 1, 1936

31 Claims. (Cl. 105—364)

The present invention relates to spring mounted cars, particularly of the mine car type and has for its purpose to provide a car of sturdy and compact construction wherein spring means are interposed between the car wheels and body. More specifically, the invention has to do with a mine car of the stub axle type wherein individual spring mountings are provided for each wheel or for a plurality of wheels on the same side of the car.

According to the preferred form of the invention to be hereinafter described, a box-like housing is provided at each side of the car, this housing receiving a wheel supporting yoke or yokes in which wheeled stub axles are mounted, spring means being interposed between the yoke or yokes and the associated housing. The housings present surfaces which constitute wall portions of the car body and are preferably, although not necessarily, cast as integral units. The housings are preferably so associated with the car body proper by means of offset flanges that the interior surfaces of the body proper are uniplanar or flush with the inner exposed surfaces of the housings. If desired, the cast housings may be connected by an integrally cast floor portion and they may also have cast therewith laterally projecting portions or wings whereby to provide extended lateral flooring portions.

We shall proceed to describe the invention more in detail with reference to several preferred embodiments, shown by way of illustration in the accompanying drawings. In the drawings.

Figure 1:
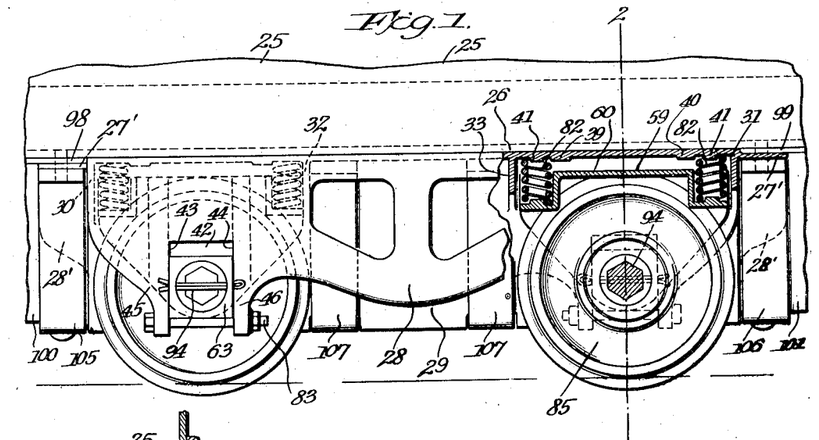
Figure 1 is a side elevation of the lower central portion of the mine car partly in section on substantially the line 2—2 of Figure 2.
Figure 2:
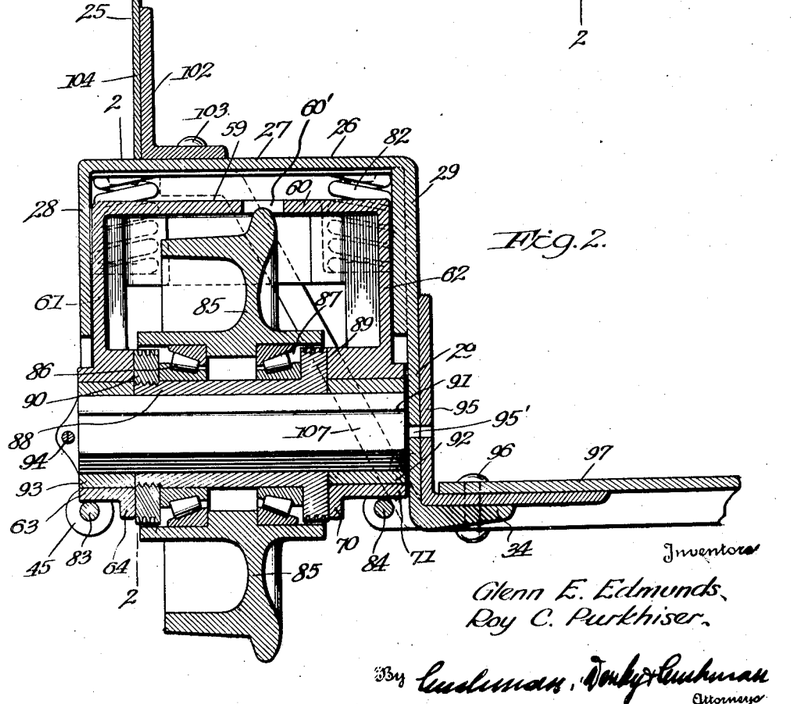
Figure 2 is a section substantially on line 2—2 of Figure 1.

Referring first to Figures 1 to 5, reference numeral 25 designates generally a car body with which is associated at opposite sides, and extending in the longitudinal direction thereof, a pair of housings of which one is shown at 26, Figures 1 and 2. Since each housing is exactly the same as the other, a description of one will suffice.

Figures 3, 4, 5:
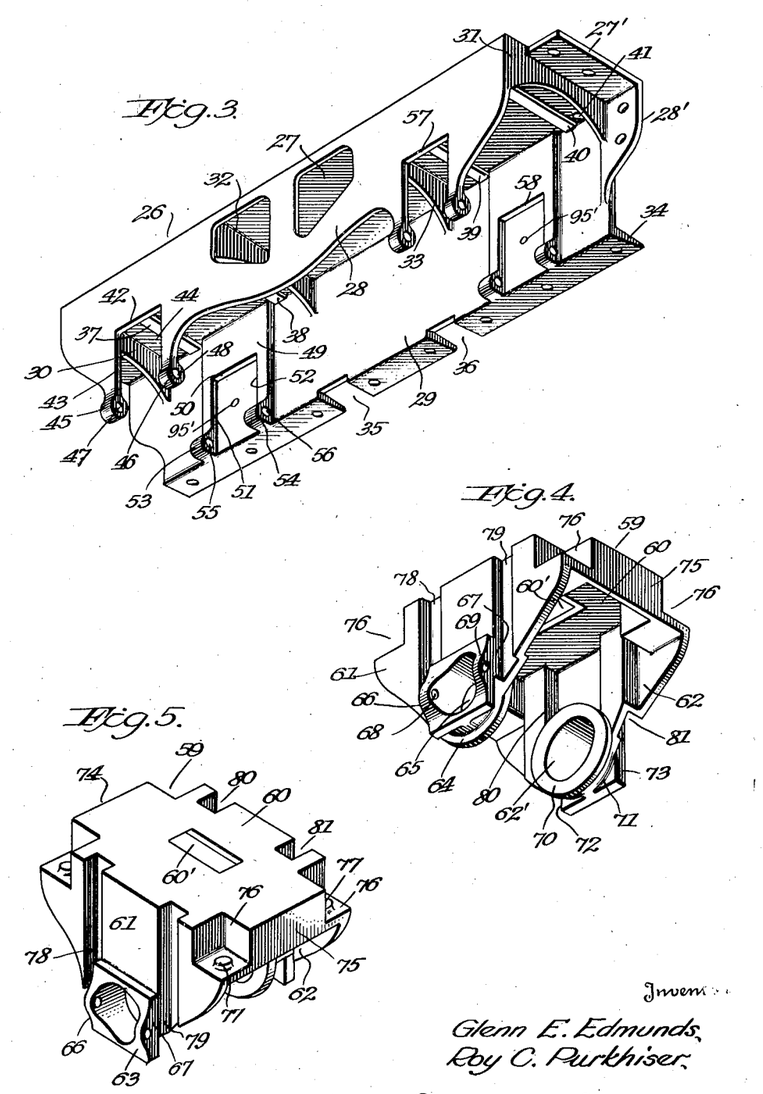
Figure 3 is a perspective view of a wheel housing.
Figure 4 is a perspective view of a wheel mounting yoke.
Figure 5 is a perspective view of the yoke of Figure 4 seen from a different direction.

As shown most clearly in Figure 3, the housing 26 is of box-like formation comprising a top wall 27 and parallel depending walls or webs 28 and 29 extending in the longitudinal direction of the housing. The ends of webs 28 and 29 are joined adjacent their tops by cross webs 30 and 31, these being perpendicular to the planes of webs 28 and 29. Similar cross webs 32 and 33 connect webs 28 and 29 inwardly of webs 30 and 31 respectively, webs 32 and 33 being equidistantly spaced from webs 30 and 31 respectively.

At its lower edge, web 29 is provided with an inwardly extending perpendicular flange 34, it being understood that web 29 is the inner web of the housing and web 28 the outer. Flange 34 is interrupted at two points intermediate webs 32 and 33 to form the cut-outs 35 and 36. Each end of top wall 27 is provided with a downwardly offset horizontally projecting flange 27' and each end of web 29 is provided with an outwardly offset vertical flange 28', the adjacent ends of the adjacent flanges 27' and 28' merging, when the housing is cast integrally, as shown in Figure 3. Ribs 37 and 38 are formed on the bottom of wall 27 adjacent webs 30 and 32 respectively, and similar ribs 39 and 40 are formed adjacent webs 33 and 31 respectively. Also formed on the bottom of wall 27 in the corners between the side webs 28 and 29 and the cross webs 30, 32 and 31, 33 are formed spring seating bosses 41.

Midway between webs 30 and 32, web 28 is provided with an upwardly extending recess or slot 42, constituting a guideway having vertical guide surfaces 43 and 44, the web being cut away to form depending arms 45 and 46 at the lower end of the guideway. The extremity of arms 45 and 46 are laterally thickened and are provided substantially in the plane of web 28 with aligned bores 47 and 48.

Web 29, intermediate ribs 37 and 38, is provided on its inner face with a thickened portion 49, this thickened portion being recessed to provide a guideway 50 having guide surfaces 51 and 52 in the planes of guide surfaces 43 and 44, respectively, of guideway 42. Thickened portion 49 at its lower extremity is provided with lugs 53 and 54 which project outwardly beyond the plane of the said thickened portion and beyond said plane are provided with aligned bores 55 and 56 in the horizontal plane of bores 47 and 48.

Midway between cross webs 31 and 33, webs 28 and 29 have formed therein guideways 57 and 58 identical with those just described.

Referring particularly to Figures 4 and 5, reference numeral 59 designates generally a wheel mounting yoke comprising a top wall 60 and depending parallel legs 61 and 62 constituting pedestals for the support of a wheeled stub axle. As here shown, the top wall is provided with a slot 60' which provides clearance for the top of a flanged car wheel as shown in Figure 2, the provision of the slot enabling the yoke to be vertically compact. At the lower end, leg 61 is provided with an outwardly projecting boss 63 and an inwardly projecting boss 64 pierced to provide an axle receiving aperture 65. The sides of boss 63 are square to provide parallel surfaces 66 and 67 for sliding guiding contact with the surfaces 43 and 44 of guideway 42. In substantially the horizontal plane of the horizontal diametrical line of aperture 65, boss 63 has outward expansions provided with aligned bores 68 and 69.

Leg 62, at its lower extremity, has an inwardly projecting boss 70 and an outwardly projecting boss 71, the latter having parallel vertical surfaces 72 and 73 for cooperation with the surfaces 51 and 52 of guideway 50, the bosses being pierced to provide an aperture 62' coaxial with aperture 65.

Legs 61 and 62 are connected to cross elements comprising vertical web portions 74 and 75 perpendicular to the planes of the legs. Pockets 76 are formed at the corners of top wall 60, these pockets having bottom walls on which are formed spring seating bosses 77. Legs 61 and 62 and web portions 74 and 75 constitute in effect a rectangular frame. Finally, leg 61 is formed with vertical grooves 78 and 79 at the sides of boss 63 and leg 62 is provided with similar grooves 80 and 81.

The yoke thus constituted may have a wheeled stub axle associated therewith prior to assembly in housing 26 or the wheel may be mounted in the yoke or removed therefrom with the yoke in place in the housing. To assemble the yoke with the housing, compression springs 82 are set in recesses 76 with bosses 77 projecting within the springs to position them. The yoke may now be introduced into one end of the housing 26 by relative movement of the parts so that bosses 63 and 71 are engaged in guideways, as 42 and 50, respectively, the grooves 78 to 81 serving to pass the opposed projections or bosses 45, 46, 53 and 54 at the lower ends of the guideways. With the yoke inserted to normal position, bolts 83 and 84 are passed through the aligned apertures 47, 48 and 55, 56, respectively, so as to underlie bosses 63 and 71 and by abutment therewith prevent separation of the members, Figures 1 and 2. The upper portion of the yoke is in guided relation to cross webs 30 and 32 and the portions of webs 28 and 29 between said cross webs. The yoke is thus effectively guided against transverse stresses by means of webs 28 and 29 and against longitudinal stresses by means of cross webs 30 and 32 and also by means of the vertical surfaces of the guideways 42 and 50 which cooperate with bosses 63 and 71 respectively. Downward movement of housing 26 relative to the yoke is limited by abutment of ribs 37 and 38 with the top 60 of the yoke. It will be understood that the upper ends of springs 82 are positioned through engagement therein of bosses 41.

Referring to Figures 1 and 2, reference numeral 85 designates a flanged wheel having a hub portion suitably recessed to receive anti-friction means such as roller bearing assemblies 86 and 87. The inner races of these bearing assemblies embrace a sleeve 88, which, at the inner side of the wheel, is provided with an integral abutment flange 89. Screwed on the other end of sleeve 88 is a ring nut 90, this and flange 89 maintaining the sleeve and wheel in proper relation. Interiorly, sleeve 88 is formed to have a mating fit with a non-round and preferably polygonal stub axle 91. The inner end of this stub axle is received with a mating fit in an exteriorly cylindrical collar 92 which is received in aperture 62' of leg 62, the outer end of the axle being received in a similar collar 93, which is received in aperture 65 of leg 61. With the yoke assembled in the housing, as particularly shown in Figure 2, the inner end of the stub axle is adapted to abut web 29 of the housing 26. Outward displacement of the axle is prevented by a cotter pin or the like 94 passed through the aligned bores 68 and 69 of boss 63.

We have described a yoke 59, supporting a wheeled stub axle and assumed to be associated with the left end of housing 26, Figures 1 and 3. It should be understood that a similar yoke assembly is associated with the right hand end of the housing. The housing 26 is either a left hand or right hand housing, web 28, of course, always being positioned at the outside.

The housings 26 may be assembled with a previously constructed car body 25, or the car body may be built up around the housings. A suitable form of car body is generally indicated in Figures 1 and 2. According to these figures, the opposed flanges 34 of the two housings 26 have riveted thereto center sill members as at 95 in the form of angle bars, which may extend for the full length of the car or even beyond the car ends, if desired. Rivets 96 also pass through a floor plate 97, the latter having its side margins disposed on the horizontal webs of the angle members for support thereby. It will be noted from Figure 2 that due to the low disposition of the flange 34, the central floor plate 97 lies below stub axle 91 so as to give large capacity with a low center of gravity.

Flare plates 98 and 99 are secured to the end flanges 27' in continuation of the top wall 27 of the housing and risers 100 and 101 are secured to the flanges 28' in continuation of web portion 29 of the housing. A longitudinal angle member 102 secured to the top wall 27 of housing 26 by means of rivets as at 103 and running the full length of the car, has secured thereto a side plate 104. The horizontal flange of angle member 102 is secured as by riveting, to the outer marginal portions of the flare plates 98, 99. For the sake of reinforcement strips 105 and 106 may be passed under the central flooring at the ends of housings 26, the ends of the straps being riveted through flanges 27'. Similar straps 107 may be positioned between the wheels, these straps being engaged in the cut-outs 35 and 36, Figure 1, and having their ends secured beneath wall 27 by means of the rivets 103. The housing walls 27 and 29 serve as portions of the side flooring structure and riser structure respectively. Angles 102 constitute, in effect, additional longitudinal sill members outwardly of members 95.

The described body which is provided with end walls, etc., in the customary manner, may be built up as a unit, leaving spaces at the sides for introduction of the housings 26, or, as stated above, the body may be built together with the housings in the first instance. The yokes may be associated with the housings before or after association of the latter with the body proper, and, as above mentioned, the wheels may be mounted in the yokes either before or after the association of the latter with the housings. In the normal position of the parts the axles may be driven out by means of a tool inserted in holes as at 95'.

Figure 6:
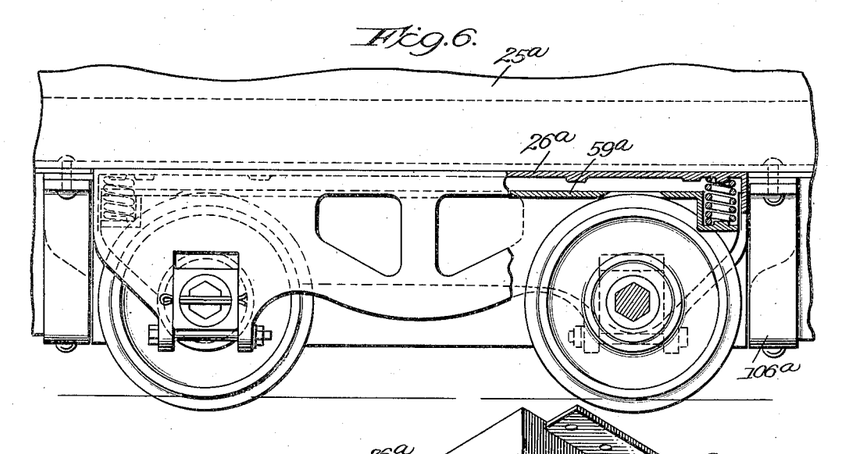
Figure 6 is a view similar to Figure 1, but showing a modified form of yoke and housing.
Figures 7, 8:
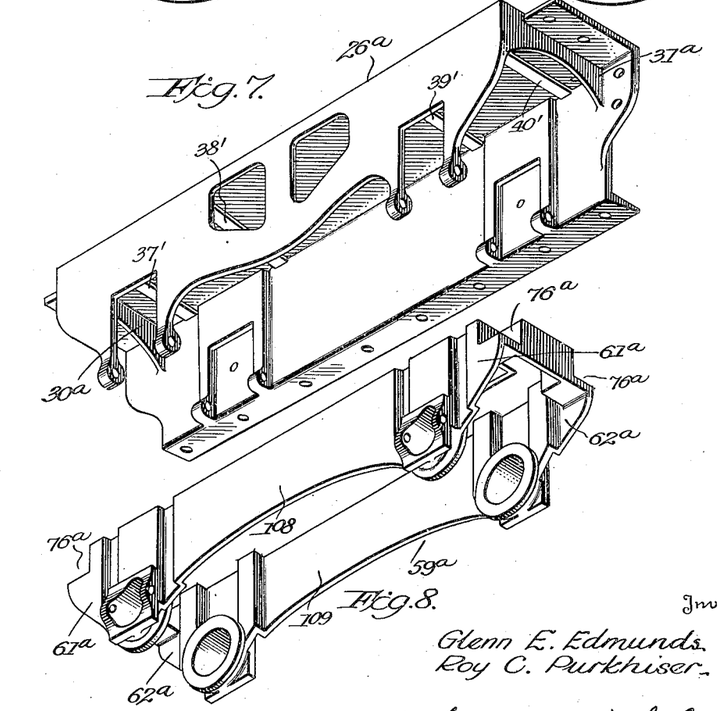
Figure 7 is a perspective view of the housing of Figure 6.
Figure 8 is a perspective view of the yoke of Figure 6.

The car body 25a of Figure 6 is identical with the body shown in Figures 1 and 2, and the housing 26a is identical with housing 26, with the exception that the inner cross webs 32 and 33 are omitted, as are also the cut-outs 35 and 36, Figure 3. A number of abutment ribs, as at 37' to 40', are provided. Yoke 59a provides for the mounting of two wheeled stub axles and its length is substantially equal to the distance between cross webs 30a and 31a of the housing 26a so as to be guided thereby. As indicated in Figure 8, four spring seating recesses 76a are provided at the corners of the yoke and the two sets of legs 61a, 62a are joined by lateral webs 108 and 109, which provide an extended lateral guiding surface for the yoke. The manner of assembly of the housing and yoke will be readily understood from the description relative to Figures 1 to 5 and the assembly of the housing with the car body is identical with that already described, straps as at 107, Figure 1, however, being omitted in order not to interfere with webs 108 and 109. Straps 105a and 106a, corresponding to straps 105 and 106 of Figure 1, may be used. As a cast article, yoke 59a is cast in a single operation as compared to the two required for two separate yokes 59. In use, however, the provision of two separate yokes 59 has some advantages over the tandem yoke 59a since each wheel has action independent of the other.

Figure 9:
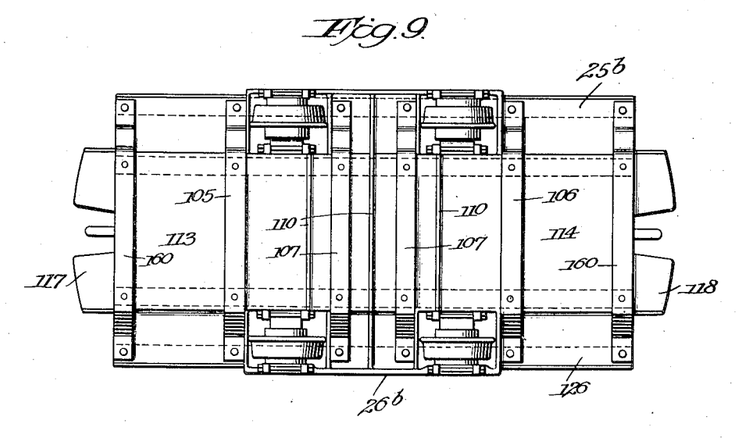
Figure 9 is a bottom plan view of a mine car provided with mounting means in accordance with the present invention, the housings being connected by an integral floor portion.
Figure 10:
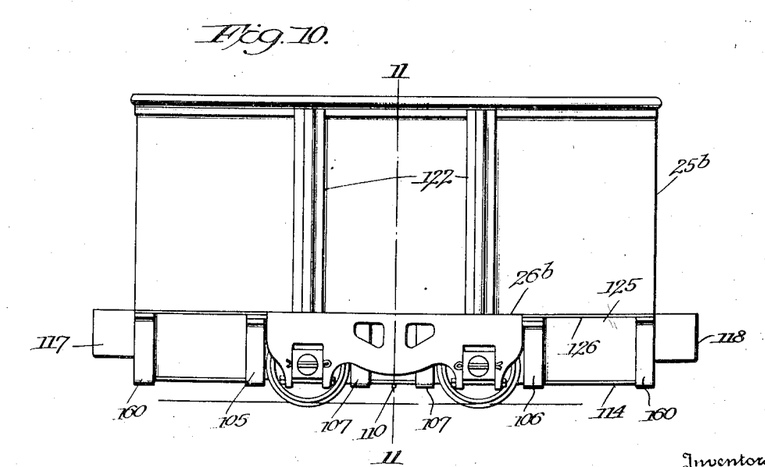
Figure 10 is a side elevation of the car of Figure 9.

In Figures 9 to 12, we have shown a modified form of mine car wherein housings 26b, instead of being provided at their inner lower edges with flanges as at 34, Figure 3, are cast integral with a central flooring portion 97b which extends throughout the length of the housings. The flooring may be suitably reinforced by transverse integral ribs 110 and at its ends is provided with downwardly offset flanges or lips 111 and 112 upon which are secured the adjacent ends of floor extension plates 113 and 114. The body may be otherwise generally the same as the body 25 above described. Longitudinal sills 115 and 116 are secured in the corners between the flooring 97b and the inner side webs of the housing 26b, and, as shown in Figures 9 and 10, may extend beyond the ends of the body to provide arms to which the bumpers 117 and 118 may be secured. A body end wall is shown at 119, Figure 11, and may be fixed or movable in whole or in part as desired. Herein the end wall 119 and side walls 128 are conceived of as being integral, with their top edges rolled and reinforced with rods as at 120 and 121, Figure 11. The walls may be reinforced by means of uprights as at 122, Figures 10 and 11.

Housings 26b are provided with end flanges in exactly the same manner as the housings 26 for the support of the riser plates and flare plates, and in all other respects may be the same as housings 26 or 26a. As here shown, however, the separate wheel yokes 59 are contemplated.

Figures 11, 13, 14, 15:
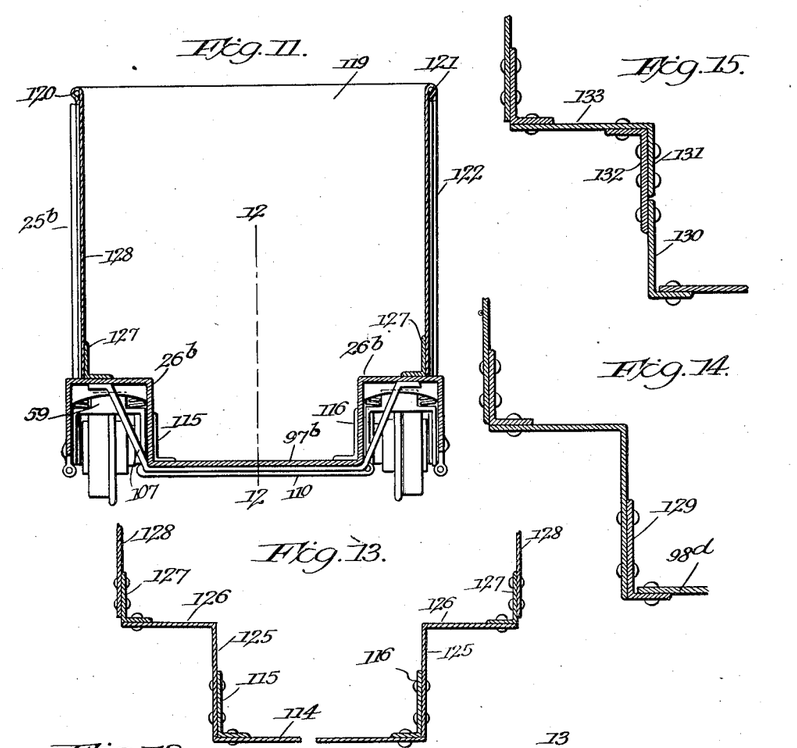
Figure 11 is a section on line 11—11 of Figure 10.
Figure 13 is a somewhat enlarged sectional view substantially on the line 13—13 of Figure 12 and illustrating a built-up central floor riser, side floor and side wall arrangement.
Figure 14 illustrates a modification of the construction shown in Figure 13.
Figure 15 illustrates a further modification of the structure shown in Figure 13.

In Figure 13, is shown the extension floor plate 114. To the longitudinal sills 115 and 116 are secured integral riser and flare portions 125 and 126 constituted by a single angle member, such members being secured to the ends of the housings through the longitudinally projecting flanges, as will be understood. If desired, the central flooring 114 and riser and side flooring portions 125 and 126 may be bent from a single sheet. Angle members 127 secured along the tops of housing 26b and to the outer margins of flare portions 126 have the side walls 128 secured thereto. In addition to the intermediate transverse members 105, 106 and 107, Figures 9 and 10 show end members 160 connecting the inner and outer sill members.

The construction shown in Figure 14 is the same as that of Figure 13 with the exception that the floor plate 98d is secured on top of the horizontal flange of the sill members of which one is shown at 129.

According to Figure 15, the longitudinal sill member 130 forms a portion of the riser proper, an angle member having a vertical flange 131 in the plane of vertical flange of member 130 to form the upper part of the riser, the two elements being secured together by means of an angle member 132. The angle member of which the vertical web 131 forms a part has a horizontal web 133 constituting a flare plate.

Figure 16:
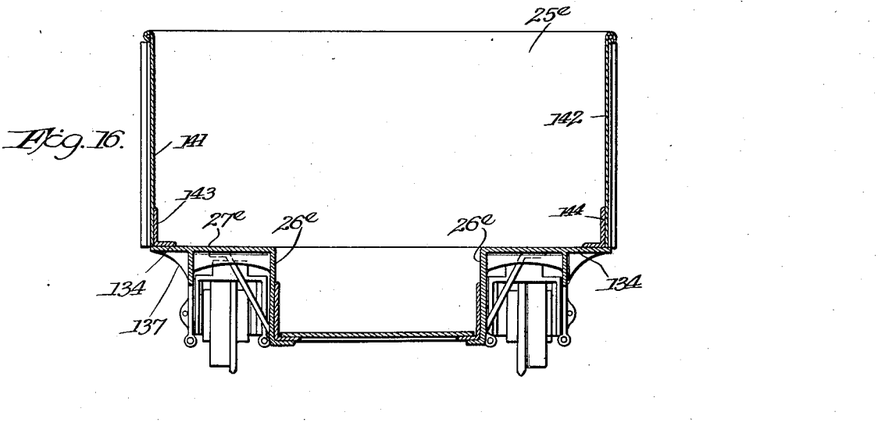
Figure 16 is a central transverse section of a mine car wherein the wheel housings are provided with integral lateral extensions.
Figure 17:
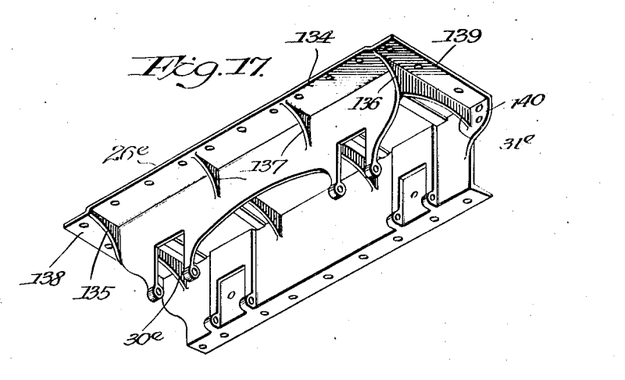
Figure 17 is a perspective of a wheel housing of Figure 16.
Figure 18:
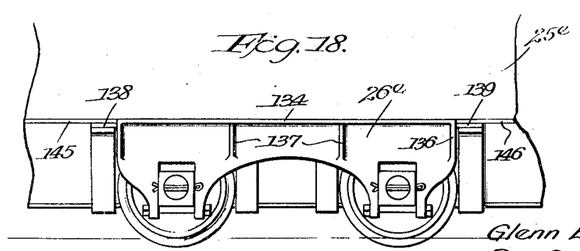
Figure 18 is a side elevation of the lower central portion of the car of Figure 16.

According to Figures 16 to 18, the housings 26e are exactly the same as housings 26 first described with the exception that their top walls 27e are laterally extended to provide flanges 134. The end transverse webs 30e and 31e are outwardly extended to form supporting gussets 135 and 136 for the ends of the flanges 134, the intermediate portions of the flanges being reinforced by gussets 137. End flanges 138 and 139 for the connection of the flare plates are somewhat downwardly offset from the common plane of top web 27e and flanges 134 and extend between the outer edges of the latter and the vertical flanges 140. Flanges 134 provide extra width for the car side flooring, the side walls 141 and 142 of the car body 25e being supported on the outermost marginal portions of the flanges 134 and connected thereto by means of angle members 143 and 144. Except for the extra width required for the flare plates 145 and 146, these being equal in width to the combined width of top web 27e and flanges 134, the body 25e may be exactly the same as to general construction features as the body 25. In order to increase further the capacity of the car, the organization may be further modified in the manner shown in Figures 19 to 21. According to these figures, the housings 26f are the same, as regards their wheel mounting provisions, as the previously described housings 26. Spaced downwardly from the tops of the housings, the outer side webs 28f are formed, as here shown, with outwardly extending webs or flanges 147, these being connected with the lower portions of the outer side webs by means of end gussets as at 148 and intermediate gussets as at 149. The end cross flanges, of which one is shown at 31f, Figure 21, are continued downwardly to rectilinear horizontal edges which terminate in longitudinally directed end flanges 150 and 151, Figure 21, these end flanges being downwardly offset as to the plane of the lateral flanges 147. Above the plane of these flanges, the walls of housings 26f are imperforate.

Figure 19:
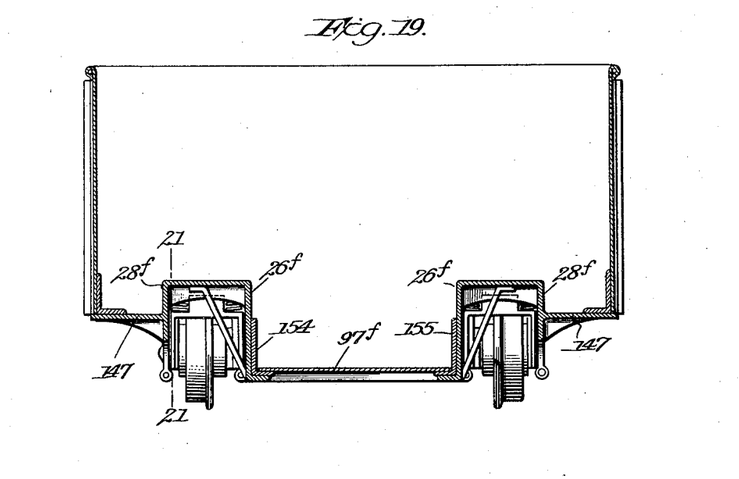
Figure 19 is a section similar to that of Figure 16 but modified as regards the position of the lateral extensions or wings.
Figure 20:
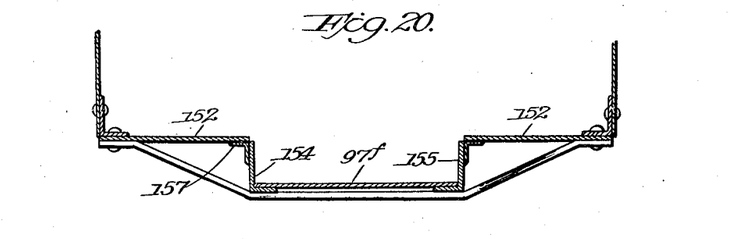
Figure 20 is a section substantially on the line 20—20 of Figure 21.
Figure 21:
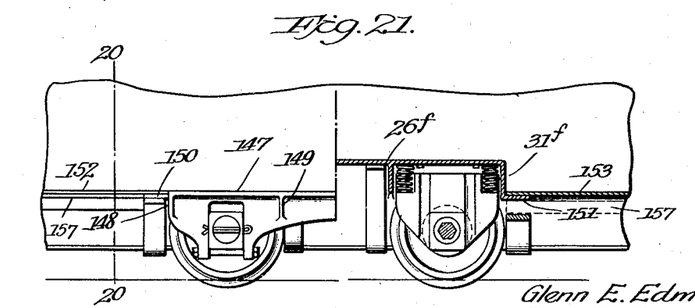
Figure 21 is a side elevation of the lower central portion of the car of Figure 19 partly in section on the line 21—21 of Figure 19.

Flanges 150 and 151 support flare plates 152 and 153 at the level of the tops of the longitudinal sill members 154, 155, Figures 19 and 20, and substantially uniplanar with lateral flanges 147, these flare plates having secured beneath their inner marginal portions angles 157 through which the flare plates are secured to the sill members from flanges 150 and 151 to the end of the car. A floor plate 97f is supported on the horizontal webs of the sill members.

In the construction just described, it will be seen that the side walls outwardly of and at the ends of housings 26f are depressed below the tops of the latter so that the capacity of the car is increased to a substantial degree without raising its center of gravity.

It will be understood that the housings 26e of Figures 16 to 18 and the housings 26f of Figures 19 and 21 could be connected by a cast integral flooring such as is shown in Figures 9 to 12, if desired. It will also be understood that various parts indicated herein as being preferably cast integral may be built up of shapes, if desired.

Figure 22:
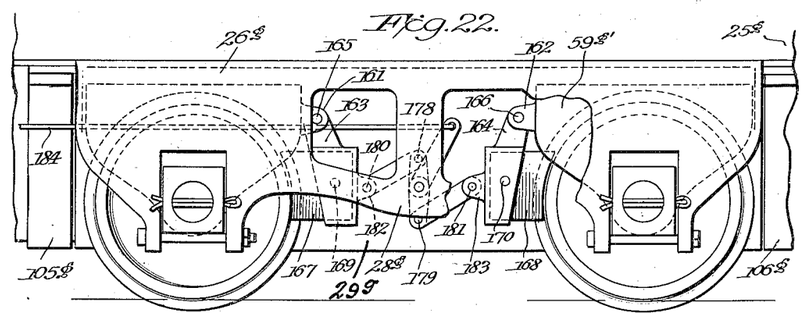
Figure 22 is a side elevation of a spring mounting comprising separate yokes, as in Figure 1, and including wheel brakes and actuating means therefor.
Figure 23:
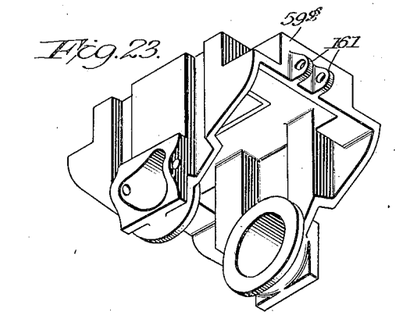
Figure 23 is a perspective of a yoke as modified in accordance with Figure 22.
Figure 24:
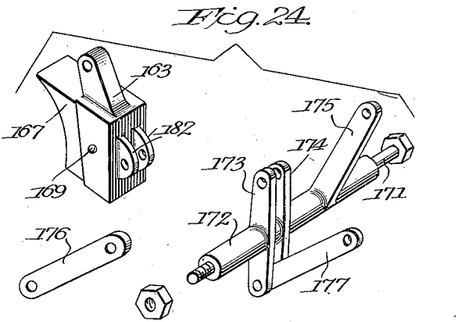
Figure 24 shows in perspective a number of elements involved in the arrangement according to Figure 22.

Figures 22 to 25 illustrate one practical manner of associating brake mechanism with the independently sprung wheels as contemplated in Figure 1. In Figure 22 reference numeral 25g designates generally a body which may be the same as the body 25 of Figure 1. Reference numeral 26g designates a housing which is the same as the housing 26 of Figure 1 with the exception that in view of the omission of the transverse members 107, Figure 1, in order to provide an unobstructed place for the brake mechanism, cut-outs 35 and 36, Figure 3, need not be provided. The transverse members 105g and 106g shown in Figure 22, correspond to the transverse members 105 and 106 of Figure 1. The yokes 59g and 59g' are provided with ears 161 and 162 on their adjacent portions and between these ears are suspended hangers 163 and 164 on pivot pins 165 and 166. These hangers are provided with pockets faced toward the respective wheels and receiving brake blocks 167 and 168 which are retained in the pockets by means of pins 169 and 170.

A bolt 171 extends through aligned bores in the outer and inner webs 28g and 29g of the housing, midway between the yokes and has mounted thereon a sleeve 172 to which are fixed two parallel two-armed levers 173 and 174 and an arm 175. Sleeve 172 is restrained as to axial movement by the webs 28g and 29g and is freely rockable on bolt 171. Links 176 and 177 are supported between the opposite ends of arms 173 and 174 on pivot pins 178 and 179 and have their other ends pivotally supported on pins 180 and 181 between parallel ears 182 and 183 on hangers 163 and 164 respectively. Arm 175 has an operating rod or cable 184 extending through yoke 59g to one side of the wheel therein supported, this operating element being so disposed as not to be interfered with by the yoke upon relative movement of the housing to the latter.

The described arrangement of parts is such that upon tensioning of operating element 184, sleeve 172 will be rocked and the hangers swung toward the wheels by means of levers 173, 174 and links 176, 177 to apply the brakes. Opposite rocking movement of the sleeve, of course, releases the brakes. It will be evident that housing 26g, in its springing movements, will move sleeve 172 relative to the hangers. The extent of this movement is not sufficient to affect unfavorably the practical operation of the devices. The hangers being suspended from the yokes have constant paths of movement relative to the wheels with which they are associated.

As shown, bolt 171 has a head which is positioned inwardly of web 29g and may be accommodated in a recess or aperture formed in the sill member which lies against the inner face of the web. Ears 161 and 162 are positioned so as not to interfere with the adjacent cross webs of the housing upon movement of the housing relative to the yokes.

Figure 25:
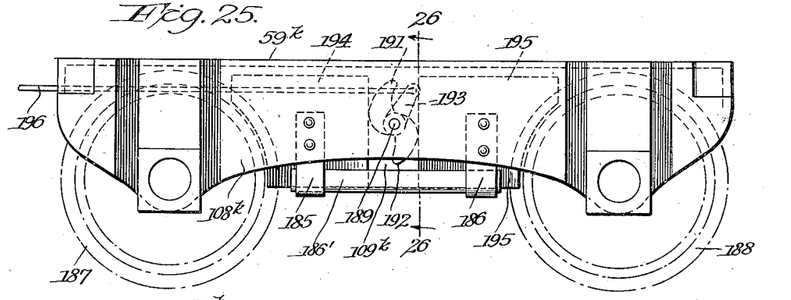
Figure 25 is a side elevation of a tandem yoke, as in Figure 8, equipped with wheel brakes and actuating means therefor.
Figure 26:
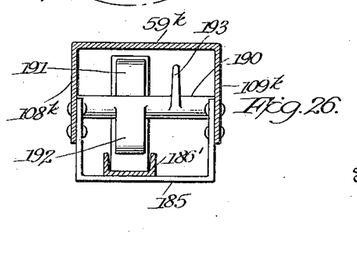
Figure 26 is a section substantially on line 26—26 of Figure 25.

Figures 25 and 26 show a practical manner of associating brake mechanism with wheels mounted in tandem relation in a single yoke member. Reference numeral 59k designates a yoke corresponding exactly to the yoke 59a of Figure 8, but having in addition a pair of stirrup straps 185 and 186 whose vertical arms are riveted to the webs 108k and 109k and whose horizontal portions support a channel member 186' in horizontal relation and in the plane of wheels 187 and 188. The channel member 186' is fixed to the stirrup straps with the top surface of its bottom wall substantially in the horizontal diametrical plane of the wheels. A bolt 189 mounted in aligned apertures in webs 108k and 109k midway between the wheels and above channel member 186' has rockably mounted thereon a sleeve 190 to which are fixed the oppositely projecting cams 191 and 192 and an operating arm 193. Brake blocks 194 and 195 are slidable in the end portions of channel 186' for simultaneous braking movement under the action of cams 191 and 192 when lever 193 is moved to rock sleeve 190. An operating rod or cable 196 is attached to the outer end of arm 193 and leads to an operating station, the operating member being passed longitudinally of the yoke toward one end of the latter and to one side of the wheel at that end of the yoke. Upward displacement of the brake blocks to an inoperative position is prevented by the top wall of the housing 59k.

It will be noted that in all the described embodiments the front and rear surfaces of the wheels are fully exposed. The cross portions of the yokes are confined to the upper ends of the latter and the transverse guiding means for the yokes are for the most part above the wheels. This is of importance not only in facilitating the disposition of the brakes between the wheels but also in view of the fact that certain types of car dumping apparatus require the end faces of the wheels to be exposed and accessible.

Figure 27:
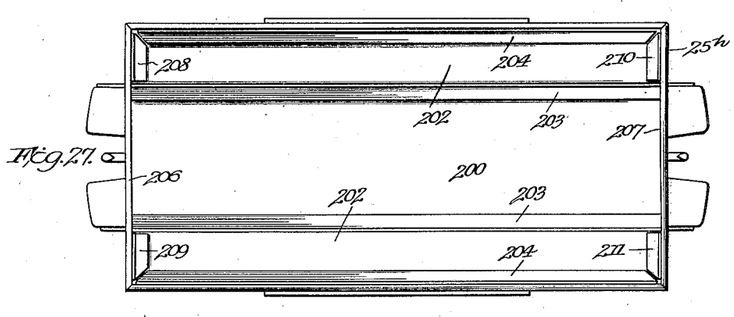
Figure 27 is a plan view of a modified car embodying the invention.
Figure 28:
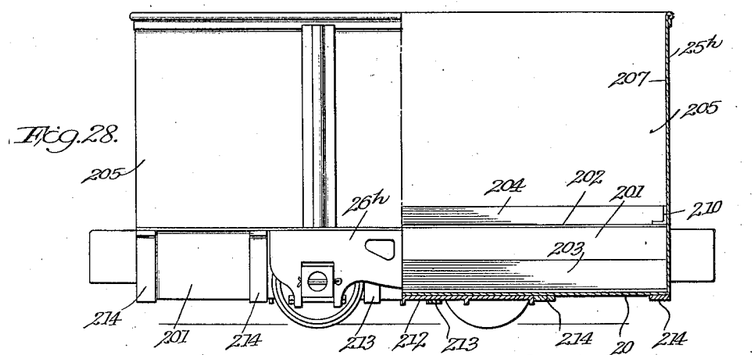
Figure 28 is a side elevation partly in central longitudinal section of the car of Figure 27.
Figure 29:
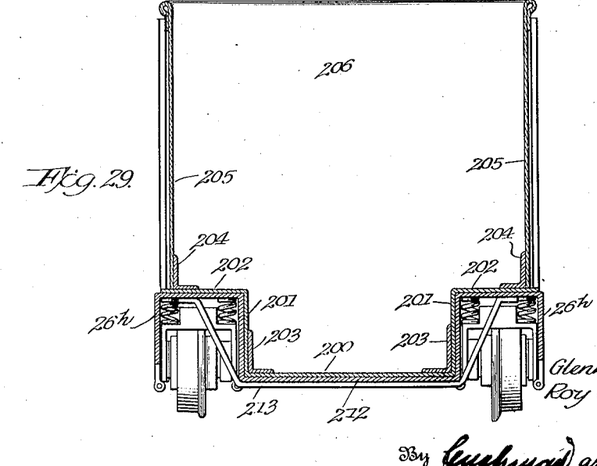
Figure 29 is a transverse section taken between the wheels of the car of Figure 27.

According to Figures 27 to 29, the car body 25h is complete in itself, particular reference being had to the side flooring portions which are not interrupted for the reception of the housings. As shown the flooring may be bent from a single metal sheet so as to provide the depressed central portion 200, the riser portions 201 and the side flooring or flare portions 202, all of these portions extending uninterruptedly from end to end of the body. Preferably center sill members 203 are secured in the corners between the central flooring portion and risers. Side sills 204 are secured to the tops of the flare portions 202, the side walls 205 being secured to the vertical webs of the side sills. The end walls 206 and 207 may be secured to the side walls and flare plates through angle members 208 to 211, Figure 27. Preferably the center sills are continued beyond the end walls 206 and 207 and have secured thereto appropriate bumper and draft devices.

The housings 26h may be connected by an integral cross member or sub-flooring portion 212 as in Figure 11, transverse members or strips 213 extending below portion 212 and secured thereto with their ends projecting therebeyond and upwardly to be secured to the housings 26h at least adjacent the outer sides of the latter.

The body bottom is so shaped and proportioned as to fit between and over the housings as most clearly shown in Figure 29, and is securable thereto to form the completed car. The body may have transverse members 214 similar to members 213 but entirely independent thereof. As shown in Figure 28, members 214 may be arranged at the ends of the sub-flooring portion 212 to serve as positioning means for the body relative to the truck.

The described construction thus contemplates a body unit and a truck unit each complete in itself and readily assembled together to form the completed car.

While the sub-flooring portion 212 is shown as being integral with the housing 26h, this is of course not essential to the invention, and it might under certain circumstances be omitted or replaced by flanges as at 34, Figure 2.

Figure 12:
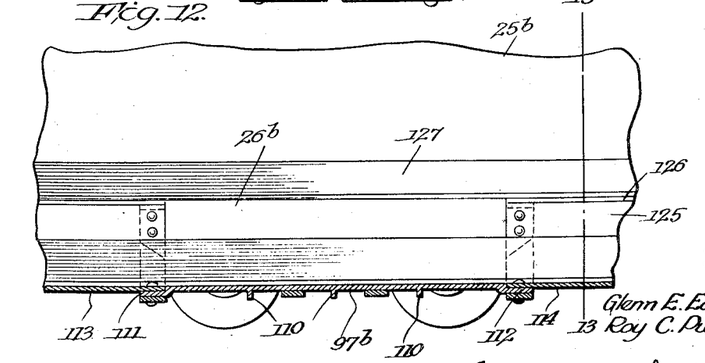
Figure 12 is a section on line 12—12 of Figure 11.

While the truck unit may be exactly the same as shown in Figures 11 and 12, it will be evident that the end flanges shown in the latter figures for the attachment of the extension floor members and risers may be omitted or if present, they may underlie strips 214. Also, in the embodiment of the invention shown in Figures 27 to 29, the top walls and side webs of the housing need not be imperforate, as in the preceding embodiments, since they do not serve directly as floor and riser portions.

It will be understood that where the housings provide floor and riser portions for the body, they may have any desired length relative to the body and might be coextensive with the latter so as to eliminate the extension flare plates and risers. Of course, the central floor portions when integral with the housings are ordinarily coextensive longitudinally with the latter. In other words, it is within the invention to provide a car bottom constituted by housing walls more or less extended beyond the wheels and connected by an integral central flooring portion or separate plate.

All the embodiments of the invention illustrated provide a mine car of great strength and durability and capable, by reason of the spring mountings, of absorbing considerable shocks without injury. It will be understood, however, that the illustrated embodiments merely exemplify preferred forms of the invention, and we do not limit ourselves to details of construction except as determined in the following claims.

We claim:—

1. In a car of the class described, a wheel housing comprising inner and outer vertical webs extending longitudinally of the car and having parallel vertical guideways formed therein, mounting means for a wheeled stub axle comprising a yoke between said webs and guided thereby for vertical sliding movements, said yoke having means slidably engaging in said guideways and preventing displacement of said yoke longitudinally of said webs, said housing and yoke each having a top wall, spring means interposed between said walls, and means limiting downward movement of the yoke relative to said webs.

2. In a car of the class described, a wheel housing comprising inner and outer vertical webs extending longitudinally of the car and having parallel vertical guideways formed therein, mounting means for a wheeled stub axle comprising a yoke between said webs and guided thereby for vertical sliding movements, said yoke having means slidably engaging in said guideways and preventing displacement of said yoke longitudinally of said webs, cross webs between the first named webs at the ends of said yoke in guiding relation to the top of the latter, said housing and yoke each having a top wall, spring means interposed between said walls, and means limiting downward movement of the yoke relative to said webs.

3. In a car of the class described, a wheel housing comprising inner and outer vertical webs extending longitudinally of the car and having parallel vertical guideways formed therein, mounting means for a wheeled stub axle comprising a yoke between said webs and guided thereby for vertical sliding movements, said yoke having bosses slidably engaging in said guideways and preventing displacement of said yoke longitudinally of said webs, said housing and yoke each having a top wall, spring means interposed between said walls, and removable means in the lower portions of said guideways engageable by said bosses to limit downward movement of the yoke relative to said webs.

4. In a car of the class described, a wheel housing comprising inner and outer vertical webs extending longitudinally of the car and having parallel vertical guideways formed therein, mounting means for a wheeled stub axle comprising a yoke between said webs and guided thereby for vertical sliding movements, said yoke having bosses slidably engaging in said guideways and preventing displacement of said yoke longitudinally of said webs, said housing and yoke each having a top wall, spring means interposed between said walls, and removable means in the lower portions of said guideways engageable by said bosses to limit downward movement of the yoke relative to said webs, said bosses being pierced to receive the ends of a wheeled stub axle.

5. In a car of the class described, a wheel housing comprising inner and outer vertical webs extending longitudinally of the car and having parallel vertical guideways formed therein, mounting means for a wheeled stub axle comprising a yoke between said webs and guided thereby for vertical sliding movements, said yoke having bosses slidably engaging in said guideways and preventing displacement of said yoke longitudinally of said webs, said housing and yoke each having a top wall, spring means interposed between said walls, and removable means in the lower portions of said guideways engageable by said bosses to limit downward movement of the yoke relative to said webs, the bosses and guideways having rectilinear cooperating surfaces.

6. In a car of the class described, a wheel housing comprising inner and outer vertical webs extending longitudinally of the car, transverse vertical webs extending between said first-named webs in rectangular relation thereto and spaced in the longitudinal direction thereof, mounting means for a wheeled stub axle comprising a yoke having a rectangular top portion guided for vertical sliding movements between said webs, spring means interposed between said housing and yoke, and means limiting relative vertical movements of the yoke and housing.

7. In a car of the class described, an integral cast wheel housing having a top horizontal wall and inner and outer parallel vertical webs depending from said wall, said inner web having end attachment flanges offset toward the outer wall and said top having downwardly offset end attachment flanges.

8. In a car of the class described, a plurality of integrally cast parallel wheel housings each having a top horizontal wall and inner and outer parallel vertical webs depending from said wall, the inner webs of said housings being connected by means of an integrally cast flooring portion, said flooring portion being provided at its ends with downwardly offset attachment flanges.

9. In a car of the class described, a plurality of parallel wheel housings each having a top horizontal wall and inner and outer parallel vertical webs depending from said wall, a central flooring portion connecting said inner webs, extension flooring portions in continuation of said central flooring portion at the ends thereof, riser plates in continuation of said inner webs at the ends thereof, flare plates in continuation of said top walls, and side walls extending longitudinally of said flare plates, said top wall and flare plates constituting side flooring portions and said inner webs constituting riser portions.

10. In a car of the class described, a wheel housing comprising a top horizontal wall, inner and outer parallel vertical webs depending from said wall, a horizontal lateral wing projecting outwardly from said outer web substantially in the plane of said top wall, and attachment flanges extending across the ends of said top wall and wing and downwardly offset therefrom, said top wall and wing forming together a side flooring portion for the car.

11. In a car of the class described, a wheel housing comprising a top horizontal wall, inner and outer parallel vertical webs depending from said wall, a horizontal lateral wing projecting outwardly from said outer web below the plane of said top wall and substantially parallel thereto, attachment flanges extending across said housing at the ends of said wings and downwardly offset from the latter; and cross webs joining the said inner and outer webs, said top wall and said flanges, said wing and top wall forming together a side flooring portion for the car.

12. In a mine car, a wheel housing comprising a top horizontal wall and parallel inner and outer depending side webs, a wheel mounting comprising a yoke having longitudinally extended side walls guided between said webs for relative vertical movement, and bearings formed in said side walls at the opposite ends thereof for the reception of a plurality of wheeled stub axles.

13. Wheel mounting means for mine cars, said mounting means comprising a yoke having a substantially rectangularly walled frame at its top and pedestal portions depending from opposite ones of the frame walls, and a housing sprung on said yoke and in which said frame is vertically slidable.

14. Wheel mounting means for mine cars, said mounting means comprising a yoke having a substantially rectangularly walled frame at its top with spring pockets formed in the corners of said frame and pedestal portions depending from opposite ones of the frame walls.

15. Wheel mounting means for mine cars, said mounting means comprising a yoke having a substantially rectangularly walled frame at its top, a top wall connecting the walls of said frame, and pedestal portions depending from opposite ones of the frame walls, and a housing sprung on said yoke and in which said frame is vertically slidable.

16. In a mine car, a wheel housing comprising spaced means having opposed parallel plane surfaces and defining a pair of downwardly open spaced vertical guideways, said means at each side of each guideway and at the lower end thereof having opposed projecting portions, a wheel mounting yoke insertable between said means and having side walls with parallel exterior surfaces for guided sliding contact with the opposed plane surfaces of said means, bosses on the yoke side walls engageable in said guideways, said side walls having parallel vertically extending channels to receive and pass said projecting portions upon insertion of the yoke in said housing, the projecting portion at the sides of each guideway being coaxially pierced, bolts in the coaxial holes in said projecting portions engaging beneath the bosses of the inserted yoke, and spring means interposed between the housing and yoke.

17. In a mine car, a wheel housing comprising a top wall and inner and outer webs depending in parallel relation from said top wall, and a car body comprising side and central flooring portions and a riser portion between said flooring portions, the top wall of said housing being substantially uniplanar with said side flooring portion and forming a part thereof and the said inner web being substantially uniplanar with the riser portion and forming a part thereof, the central flooring portion being connected to said inner web.

18. In a mine car, a wheel housing comprising a top wall and inner and outer webs depending in parallel relation from said top wall, and a car body comprising side and central flooring portions and a riser portion between said flooring portions, the top wall of said housing being substantially uniplanar with said side flooring portion and forming a part thereof and the said inner web being substantially uniplanar with the riser portion and forming a part thereof, the central flooring portion being connected to said inner web through a horizontal flange on the latter.

19. In a mine car, wheel mounting means comprising a housing, a yoke in said housing relative to which the housing is vertically movable, spring means resisting downward movement of the housing relative to the yoke, a brake hanger pivoted to the yoke, and brake actuating means carried by the housing.

20. In a mine car, wheel mounting means comprising a housing, a pair of yokes mounted in tandem relation in said housing and relative to which the housing is vertically movable, spring means resisting downward movement of the housing relative to the yokes, brake hangers pivoted to the adjacent ends of the yokes, and brake actuating means carried by the housing between said hangers.

21. In a mine car, wheel mounting means comprising a housing, a yoke in said housing relative to which the housing is vertically movable, spring means resisting downward movement of the housing relative to the yoke, a pair of wheeled stub axles mounted in tandem relation in said yoke, a horizontally extending guide member supported by the yoke between the wheels, a pair of brake blocks slidable on said guide member, and brake operating means comprising means carried by the yoke and extending between said blocks, said last named means being operable to move the blocks simultaneously against the wheels.

22. In a mine car, wheel mounting means comprising a housing, a pair of wheels in tandem relation in said housing and upon which the housing is sprung, brake shoes mounted independently of the housing so as to have a constant path of movement relative to the wheels, and a common actuating means for said brake shoes.

23. Wheel mounting means for mine cars, said mounting means comprising a housing having parallel vertically extending webs connected together at their tops, a yoke positioned between said webs for relative vertical movement, spring means between the housing and yoke, and guide means for the yoke comprising a vertical guideway on one of said webs and confined to the inner side thereof, and means on the yoke engaged in said guideway, said last-named web being substantially imperforate.

24. Wheel mounting means for mine cars, said mounting means comprising a housing having parallel vertically extending webs connected together at their tops, a yoke positioned between said webs for relative vertical movement, spring means between the housing and yoke, and guide means for the yoke comprising a vertical guideway on one of said webs and confined to the inner side thereof, and means on the yoke engaged in said guideway, said last-named web being substantially imperforate, the other of said webs having a vertical guide slot engaged by a yoke portion.

25. Wheel mounting means for mine cars, said mounting means comprising a housing having parallel vertically extending webs connected together at their tops, a yoke positioned between said webs and having side walls slidably contacting the inner surfaces of the webs, spring means between the housing and yoke, bearings for a stub axle in the lower portions of said side walls, bosses projecting outwardly of said walls in the vicinity of said axle, vertical guideways provided by said webs for said bosses, the guideway on one of said webs being constituted by a channel which does not interrupt the continuity of the web, and means between said webs guiding the upper portions of the yoke against displacement longitudinally of said web.

26. Wheel mounting means comprising a yoke having a pair of legs and a top connecting portion, a wheeled stub axle supported in bearings in the lower portions of said legs, said top connecting portion being entirely above the axles so as to leave the front and rear surfaces of the wheels exposed, and guide means for the yoke sprung on the latter and designed to leave said surfaces exposed in all springing relations of the parts.

27. In a mine car, a truck comprising a pair of parallel housings, yokes within the housings on which the latter are sprung, means connecting the lower portions of the housings to maintain the spaced relation of the latter, wheeled stub axles in the yokes, and a body having a depressed central floor portion supported on said connecting means and side flooring portions supported on said housings.

28. In a mine car, housings arranged in parallel relation, yokes in the housings on which the housings are sprung, wheeled stub axles mounted in the yokes, and a body supported on said housings, said body comprising center sills and side sills secured to said housings, and flooring portions supported by said sills.

29. In a mine car, housings arranged in parallel relation and having inwardly projecting flanges on the lower portions of their inner sides, yokes in the housings on which the housings are sprung, wheeled stub axles mounted in the yokes, and a body supported on said housings, said body comprising center sills supported by said flanges and side sills secured to the housings outwardly of the center sills, and flooring portions supported by said sills.

30. A mine car comprising a pair of center sills in the form of angle bars having vertical webs and inwardly extending bottom horizontal webs, a pair of side sills outwardly of the center sills shaped and relatively disposed as the latter, a central flooring portion supported by the horizontal webs of the center sills, side flooring portions extending between the horizontal webs of the side sills and the tops of the center sills, housings secured between the center and outer sills on the same side of the car, and stub axle mounting means in the housings on which the latter are sprung.

31. A mine car comprising a body having side flooring portions and a central flooring portion below said side flooring portions, housings at the sides of the body and supporting the same, yokes within the housings on which the latter are sprung, wheeled stub axles mounted in the yokes, and transverse braces extending entirely across and under the central floor portion and secured thereto and having their ends projecting beyond the central flooring portion and secured to said housings adjacent the outer sides of the latter.

GLENN E. EDMUNDS.
ROY C. PURKHISER.